United States Patent Office 2,777,793
Patented Jan. 15, 1957

2,777,793
FUNGICIDAL COMPOSITION AND METHODS OF APPLYING

Clifton R. Neumoyer, Ambler, Pa., assignor to The Pennsylvania Salt Manufacturing Company, Philadelphia, Pa., a corporation of Pennsylvania No Drawing. Application April 2, 1953, Serial No. 346,514

7 Claims. (Cl. 167—30)

This invention relates to the use of 5-chloro-2-hydroxy-α(trichloromethyl)benzyl alcohol as a fungicide.

This compound was prepared essentially according to the method of Haakh and Smola as disclosed in Austrian Patent No. 141,159, granted March 25, 1935. A mixture of 1 mol of p-chloro-phenol and 1 mol of chlorate hydrate was heated until dissolution occurred, cooled and made alkaline. The reaction mixture was extracted with benzene, steamed, dried, and recrystallized from benzene.

The compound 5 - chloro - 2 - hydroxy-α-(trichloromethyl)benzyl alcohol is insoluble in water, hence, when it is applied to plants as a fungicide, it may be used in a dry mix together with a fungicidal adjuvant, such as finely divided sodium carbonate, diatomaceous earth, talc, gypsum, fuller's earth, pyrophyllite, and kaolin. This composition may be made water-wettable, if desired, by the addition of a surfactant, such as one of those listed by McCutcheon, J. W., Soap and Sanitary Chemicals, August, September, and October, 1949.

The active compound may also be dissolved in a solvent such as alcohol or acetone and emulsified in water with the addition of any of the well-known emulsifying agents commonly used for this purpose, such as Nacconol NR, which is a sodium alkylaryl-sulfonate; Advawet 15, which is a sodium salt of petroleum polyether alcohol; Nonic 218, which is a polyethylene glycol tert-dodecylthio-ether; Igepon AP, which is an ester of sodium isethionate; and Triton X-155, which is an alkylaryl polyether alcohol.

The active compound may also be dissolved in dilute aqueous alkali and the term adjuvant, as used herein, includes finely divided solid materials, dispersing phases and emulsifying agents in emulsion formulations, and non-phytotoxic solvents for the active compound.

The invention will be further illustrated by reference to the following specific examples:

Example 1

Slide germination tests for fungicidal activity against fungus spores were made according to the method of the American Phytopathological Society (American Phytopathological Society, Committee on Standardization of Fungicide Tests, Phytopath. 33 (7) 627–632 (1943)), as modified by Miller, H. J. (Miller, H. J., Modifications of the Slide Germination Method of Evaluating Fungicides Including the Use of Venturia Inaequalis and Phytophthora Infestans, Phytopath. 39 (4) 245–259 (1949)).

In this modified method, measured quantities of a water solution suspension or emulsion of the chemical to be tested are applied to a known area on a microscope slide to produce twelve deposits, ranging from 0.03 to 100 micrograms per square centimeter, after the water has evaporated over a period of twenty-four hours. A 0.1 ml. portion of a spore suspension of a given organism is pipetted over the entire area of the dry deposit and, after incubation in an atmosphere of 100% humidity for twenty-four hours, the number of spores inhibited from germination is counted and the percentage inhibition in probits is plotted against the log of the concentration. The concentration of deposit on the line which inhibited 50% of the spores is the ED 50 value. An ED 50 value of less than 0.1 is rated as AA, 0.1–1.0 as A, 1.0–10.0 as B, and so forth. Thus an AA compound has excellent fungicidal properties, while a D rating indicates no fungicidal properties.

Slide germination tests on the compound 5-chloro-2-hydroxy-α-(trichloromethyl)benzyl alcohol gave an A rating to this compound thereby indicating a high fungicidal activity against the following fungus organisms: *Sclerotina fructicola*, *Venturia inaequalis*, and *Alternaria solani*.

Example 2

Additional tests on the fungicidal properties of the compound 5-chloro-2-hydroxy-α-(trichloromethyl)benzyl alcohol were conducted with late blight (*Phytophthora infestans*) on tomato foliage in a greenhouse. The test method employed was similar to that described by McCallan et al. (McCallan, S. E. A. et al., A Greenhouse Method of Evaluating Fungicides by Means of Tomato Foliage Diseases. Contrib. Boyce Thompson Inst. 13 93–134 (1943)), where replicated potted tomato plants are sprayed with a 0.2% by weight concentration of the test compound as an emulsion in water. The disease control efficiency of the test compound is determined by inoculating the plants with a spore suspension of the causal organism and incubating the organism under suitable conditions for the infection to take place. A count is then made of the number of diseased spots on the leaves and this figure is then expressed as a percentage of the number of spots on untreated check plants. A compound having a number from 0–0.5% is rated as an AA fungicide; 0.5–3%, A; 3.0–15%, B; 15–75%, C; 75–100%, D.

The compound 5 - chloro - 2 - hydroxy-α-(trichloromethyl)benzyl alcohol had a B rating in this test, indicating activity for the control of late blight.

Excellent control of powdery mildew (*Erysiphi polygoni*) on bean foliage has been obtained by application of a 0.1% by weight emulsion in water of the compound 5 - chloro-2-hydroxy-α-(trichloromethyl)benzyl alcohol. This compound has also been found active against mildew of cotton cloth.

The active compound of the invention may be applied at rates ranging from about 1 pound to 3 pounds or more of active ingredient per acre, depending upon the plant upon which it is used. The reference in the claims to the rate of application being a stated number of pounds per acre is intended to define also the rate when only one or a few plants are treated, as in nursery work, the rate per plant being capable of calculation from the acre rate by assuming a normal spacing of such plants in an acre of planting.

It will be obvious to those skilled in the art that many modifications may be made within the scope of the present invention without departing from the spirit thereof and the invention includes all such modifications.

I claim:

1. A method of controlling fungus which comprises contacting the fungus with 5-chloro-2-hydroxy-α-(trichloromethyl)benzyl alcohol.

2. A method of controlling fungus on plants which comprises contacting the stem and foliage of plants with 5-chloro-2-hydroxy-α-(trichloromethyl)benzyl alcohol.

3. The method of claim 6 in which the active ingredient is applied at a rate between about 1 to 3 pounds per acre, calculated on the basis of a field of plants spaced at normal intervals.

4. The method of claim 7 in which the active ingredient is applied at a rate between about 1 to 3 pounds per acre, calculated on the basis of a field of plants spaced at normal intervals.

5. A fungicidal composition comprising 5-chloro-2-hydroxy-α-(trichloromethyl)benzyl alcohol and a fungicidal adjuvant as a carrier therefor.

6. The method of controlling fungus on plants which comprises contacting the stems and foliage of the plants with a finely-divided mixture of 5-chloro-2-hydroxy-α-(trichloromethyl)benzyl alcohol and a solid inert extender.

7. The method of controlling fungus on plants which comprises spraying the stems and foliage of the plants with an aqueous emulsion of 5-chloro-2-hydroxy-α-(trichloromethyl)benzyl alcohol.

References Cited in the file of this patent

UNITED STATES PATENTS

| | | |
|---|---|---|
| 2,477,978 | Graenacher | Aug. 2, 1949 |

FOREIGN PATENTS

| | | |
|---|---|---|
| 141,159 | Austria | Mar. 25, 1935 |

OTHER REFERENCES

March et al.: Journ. Econ. Ent., vol. 45, pp. 851–860, October 1952.

Cristol et al.: Chem. and Eng. News, November 25, 1945, pp. 2070–2075.